US012567395B2

(12) United States Patent
Zou et al.

(10) Patent No.: US 12,567,395 B2
(45) Date of Patent: Mar. 3, 2026

(54) MUSIC GENERATION METHOD, MUSIC GENERATION APPARATUS AND COMPUTER-READABLE STORAGE MEDIUM

(71) Applicant: Beijing Zitiao Network Technology Co., Ltd., Beijing (CN)

(72) Inventors: Rong Zou, Beijing (CN); Ziyang Zheng, Beijing (CN); Song Luo, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/059,192

(22) Filed: Feb. 20, 2025

(65) Prior Publication Data

US 2025/0336382 A1    Oct. 30, 2025

Related U.S. Application Data

(63) Continuation of application No. PCT/CN2024/089579, filed on Apr. 24, 2024.

(51) Int. Cl.
*G10H 1/00*       (2006.01)
*G06F 40/40*      (2020.01)
*G10L 13/027*     (2013.01)

(52) U.S. Cl.
CPC .......... *G10H 1/0025* (2013.01); *G06F 40/40* (2020.01); *G10L 13/027* (2013.01); *G10H 2210/111* (2013.01); *G10H 2220/116* (2013.01)

(58) Field of Classification Search
CPC .......... G10H 1/0025; G10H 2210/111; G10H 2220/116; G06F 40/40; G10L 13/027
(Continued)

(56) References Cited

U.S. PATENT DOCUMENTS

2003/0128825 A1 *  7/2003  Loudermilk ........ H04M 3/4285
                                                        379/102.01
2017/0092247 A1 *  3/2017  Silverstein ............. G06N 20/00
(Continued)

FOREIGN PATENT DOCUMENTS

CN          108369799 A  *  8/2018  ............... G06N 7/01
CN          110808019 A  *  2/2020  ............... G06N 3/08
(Continued)

OTHER PUBLICATIONS

International Search Report and Written Opinion for PCT/CN2024/089579, mailed on Jan. 10, 2025, 22 pages.
(Continued)

*Primary Examiner* — Christina M Schreiber

(74) *Attorney, Agent, or Firm* — Astute IP Law Group

(57) ABSTRACT

The present disclosure relates to a music generation method, music generation apparatus and computer-readable storage medium, and falls into the field of computer technology. The music generation method includes: receiving a first prompt information input by a user, the first prompt information comprising descriptive information of music; generating a first musical work according to the first prompt information, the first musical work comprising a first music; and generating a second musical work according to an adjustment operation of the user on the first musical work, the adjustment operation comprising at least one of an adjustment operation on the first prompt information or an adjustment operation on the first music.

19 Claims, 8 Drawing Sheets

(58) Field of Classification Search
USPC ............................................................ 84/602
See application file for complete search history.

(56) References Cited

U.S. PATENT DOCUMENTS

| | | | | |
|---|---|---|---|---|
| 2018/0190249 A1 * | 7/2018 | Roblek | .................. | G06N 3/044 |
| 2019/0279607 A1 * | 9/2019 | Joshi | .................... | G10H 1/0033 |
| 2020/0005744 A1 * | 1/2020 | Godunov | .............. | G06F 16/683 |
| 2020/0168191 A1 | 5/2020 | Silverstein | | |
| 2020/0372896 A1 | 11/2020 | Cui et al. | | |
| 2021/0224319 A1 * | 7/2021 | Ingel | .................... | G06N 3/0455 |
| 2021/0312897 A1 | 10/2021 | Ackerman et al. | | |
| 2022/0208156 A1 * | 6/2022 | Chen | .................... | G06F 3/0483 |
| 2022/0223125 A1 | 7/2022 | Zhou et al. | | |
| 2024/0290305 A1 * | 8/2024 | Yu | ......................... | G10H 1/0025 |
| 2024/0290306 A1 * | 8/2024 | Zhang | .................. | G06F 40/253 |
| 2024/0371345 A1 * | 11/2024 | Xue | ........................ | G06F 16/68 |
| 2025/0245872 A1 * | 7/2025 | Cokely | .................. | G06F 16/58 |

FOREIGN PATENT DOCUMENTS

| | | | | | |
|---|---|---|---|---|---|
| CN | 111554267 A | | 8/2020 | | |
| CN | 112632906 A | * | 4/2021 | .......... | G06F 40/279 |
| CN | 112785993 A | | 5/2021 | | |
| CN | 113611267 A | | 11/2021 | | |
| CN | 115428070 A | | 12/2022 | | |
| CN | 117690401 A | | 3/2024 | | |
| CN | 110189741 B | * | 9/2024 | ............. | G11B 27/02 |
| CN | 118897663 A | * | 11/2024 | ......... | G10H 11/0025 |
| CN | 119072740 A | * | 12/2024 | | |
| CN | 119137652 A | * | 12/2024 | | |
| CN | 119360810 A | * | 1/2025 | ........... | G10H 1/0025 |
| WO | WO-2004064036 A1 | * | 7/2004 | ............. | G06F 3/165 |
| WO | 2017058844 A1 | | 4/2017 | | |
| WO | 2021168563 A1 | | 9/2021 | | |

OTHER PUBLICATIONS

Extended European Search Report received for European Application No. 24852988.5 mailed on Oct. 7, 2025, 13 pages.
Agostinelli, Andrea et al., "MusicLM: Generating Music From text," arXiv preprint arXIV:2301.11325, Jan. 2023, 21 pages.

* cited by examiner

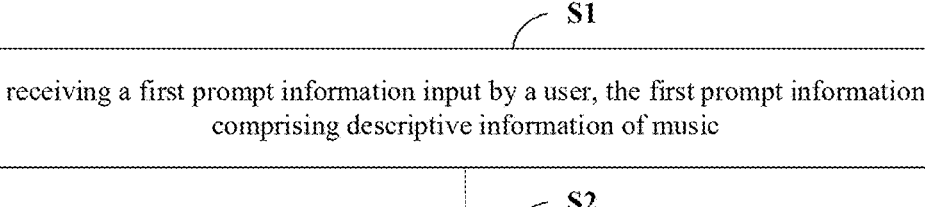

S1 receiving a first prompt information input by a user, the first prompt information comprising descriptive information of music

S2 generating a first musical work according to the first prompt information, the first musical work comprising a first music

S3 generating a second musical work according to an adjustment operation of the user on the first musical work, the adjustment operation comprising at least one of an adjustment operation on the first prompt information or an adjustment operation on the first music

Fig. 1

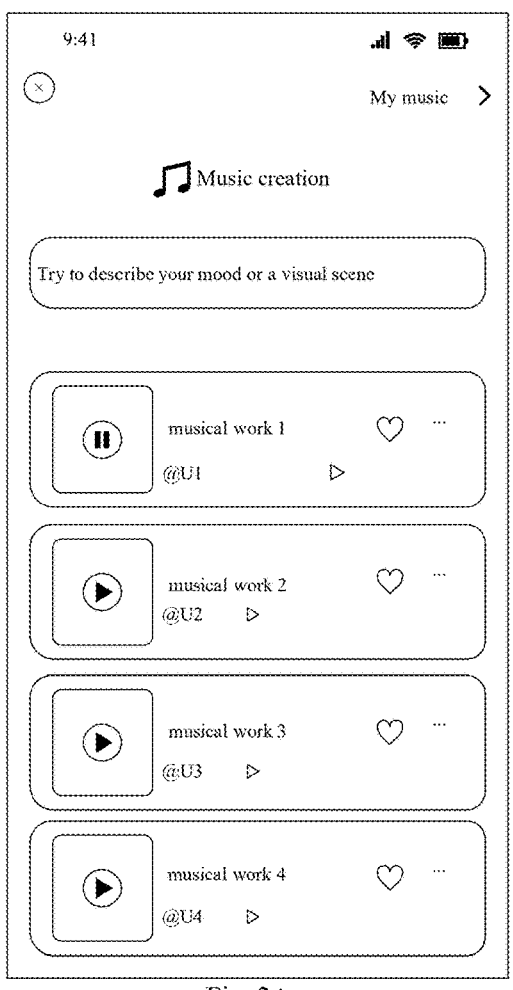

Fig. 2A

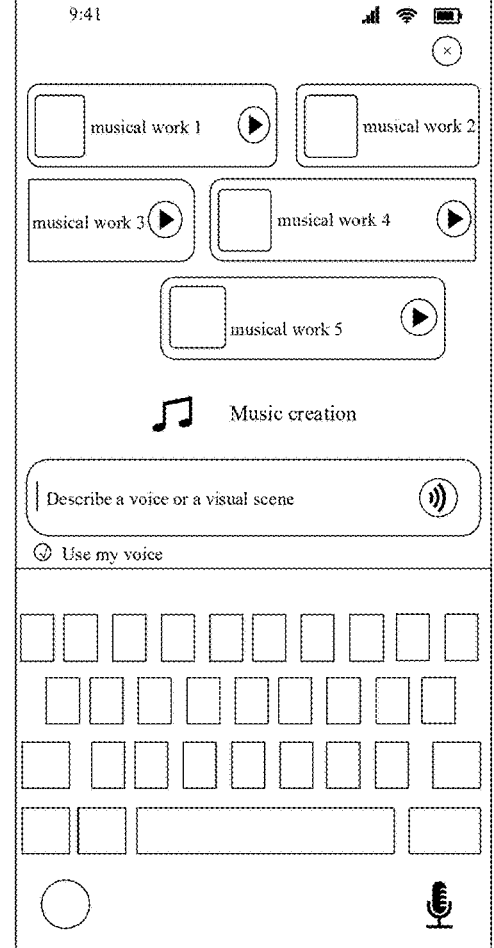

Fig. 2B

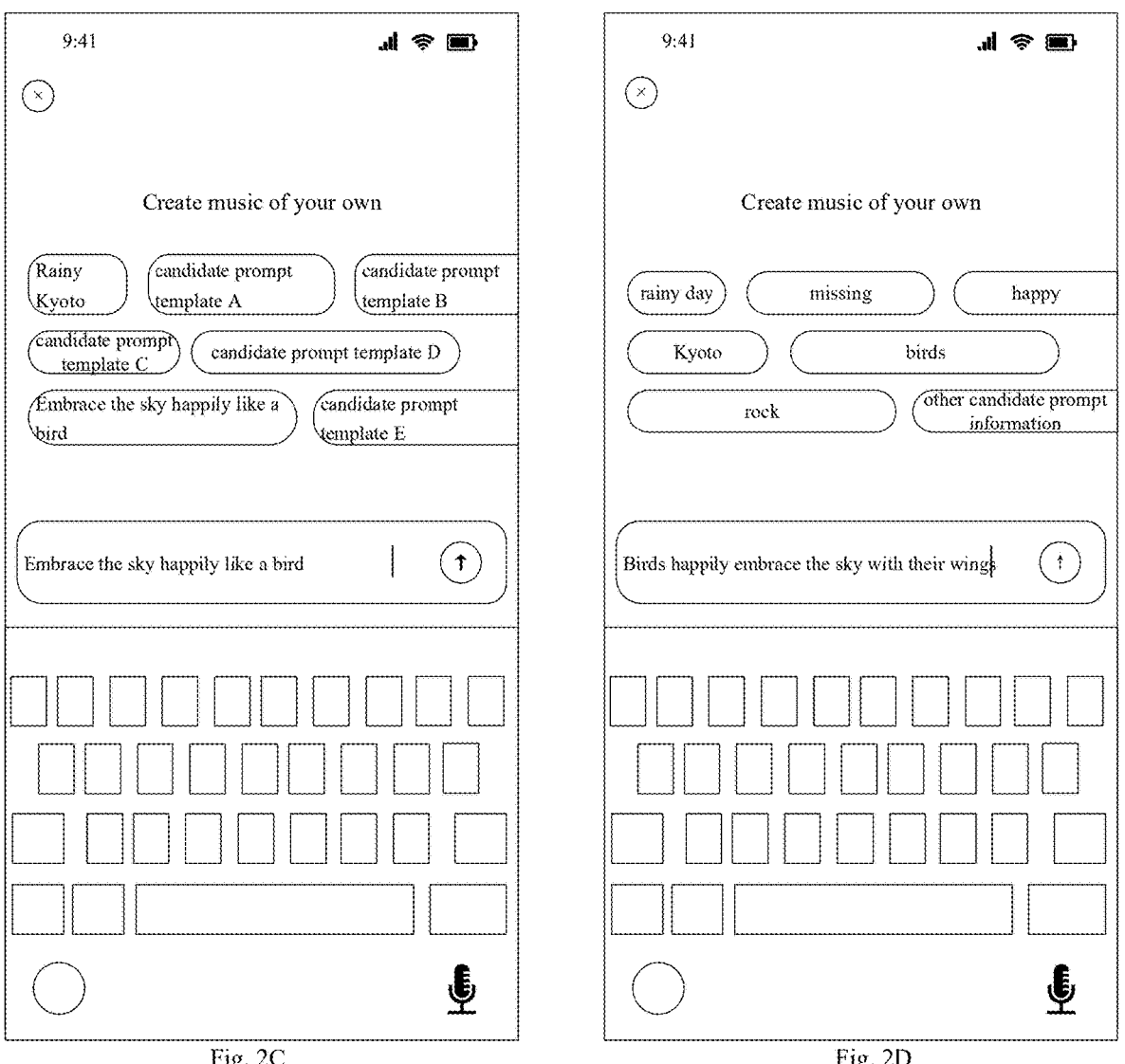
Fig. 2C                                        Fig. 2D

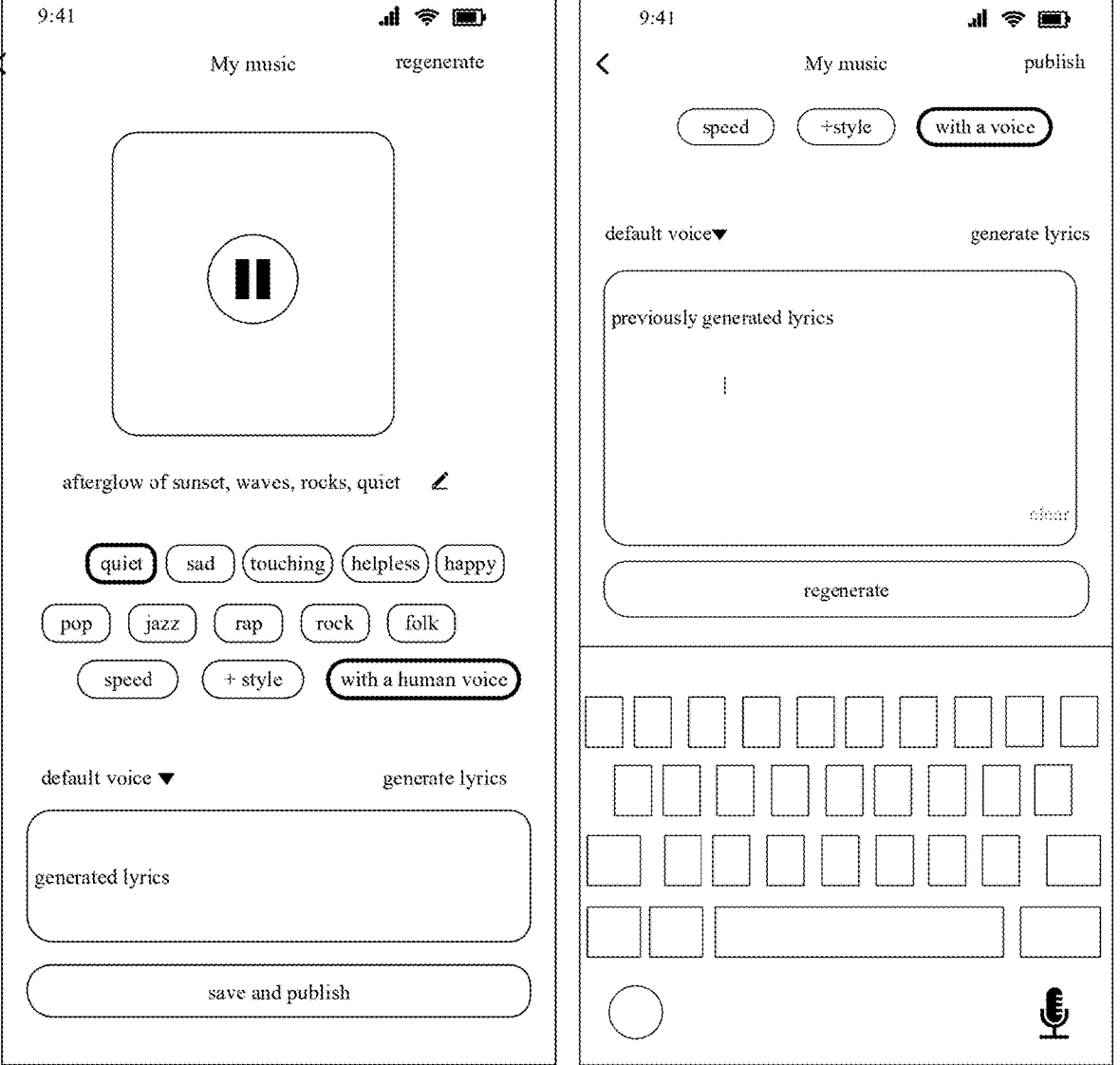
Fig. 3A                                        Fig. 3B

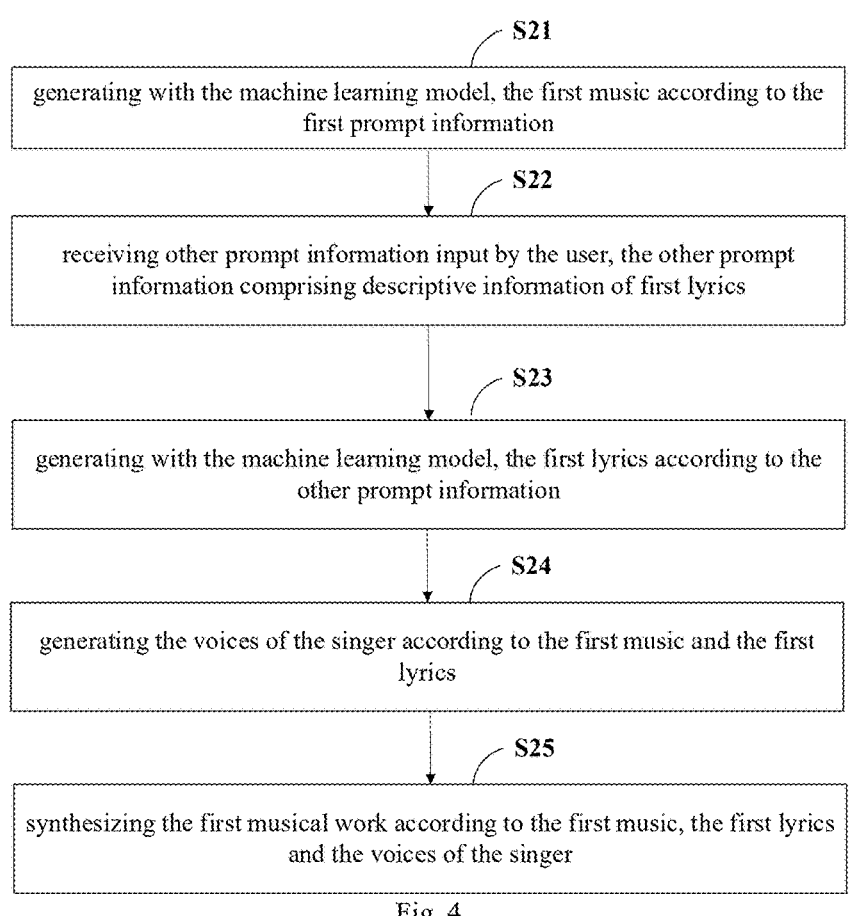

S21 generating with the machine learning model, the first music according to the first prompt information

S22 receiving other prompt information input by the user, the other prompt information comprising descriptive information of first lyrics

S23 generating with the machine learning model, the first lyrics according to the other prompt information

S24 generating the voices of the singer according to the first music and the first lyrics

S25 synthesizing the first musical work according to the first music, the first lyrics and the voices of the singer

Fig. 4

S31 displaying the first prompt information on the interactive interface

S32 receiving modification operation of the user on the first prompt information

S33 displaying a second prompt information obtained based on the modification operation

S34 generating with the machine learning model, the second musical work according to the second prompt information

Fig. 5A

S31' generating the second music according to adjustment operation of the user on the first musical work

S32' adjusting the first lyrics according to at least one of the melody, rhythm or style type of the second music to obtain second lyrics

S33' synthesizing the second musical work according to the second music and the second lyrics

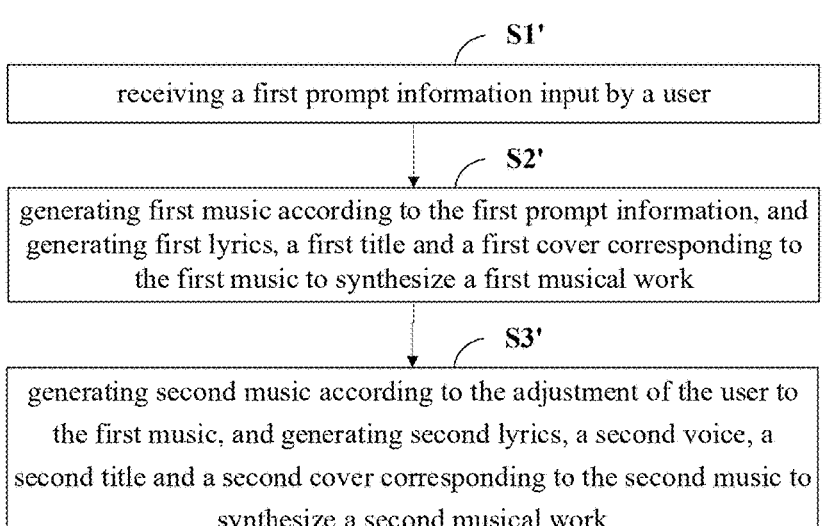

S1' receiving a first prompt information input by a user

S2' generating first music according to the first prompt information, and generating first lyrics, a first title and a first cover corresponding to the first music to synthesize a first musical work

S3' generating second music according to the adjustment of the user to the first music, and generating second lyrics, a second voice, a second title and a second cover corresponding to the second music to synthesize a second musical work

Fig. 7

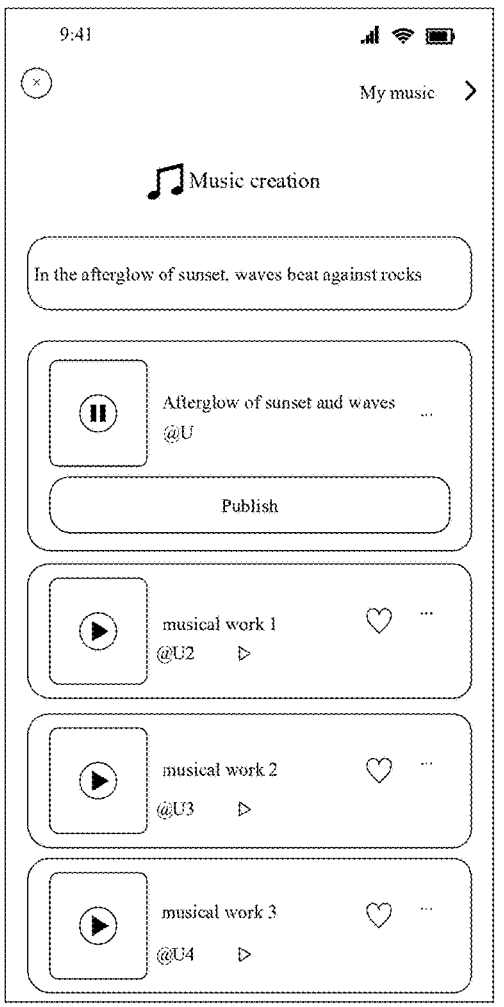

Fig. 8A

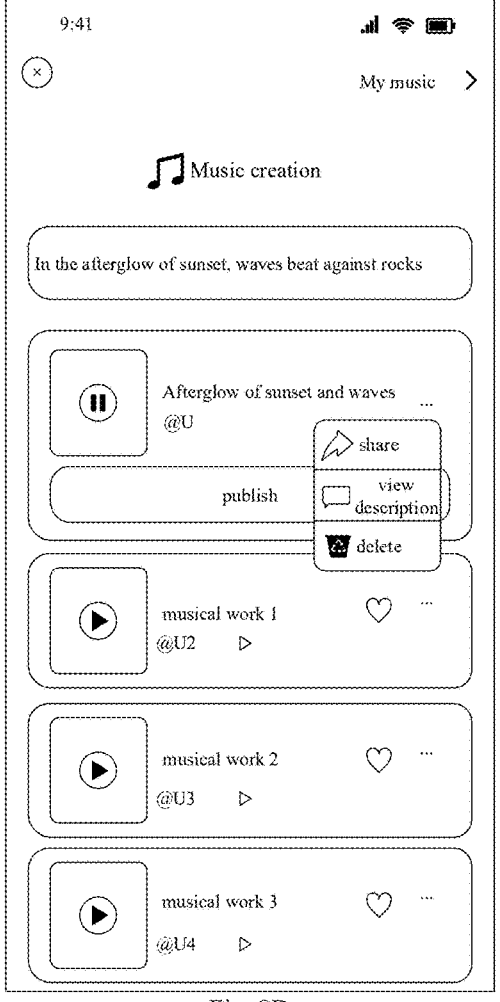

Fig. 8B

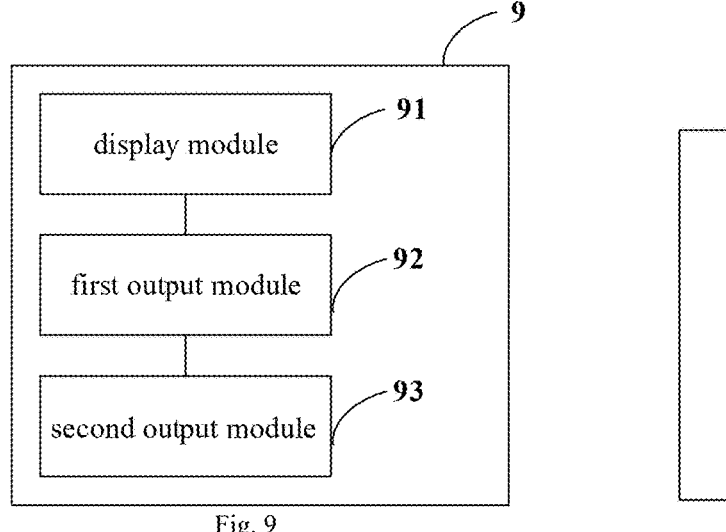
Fig. 9
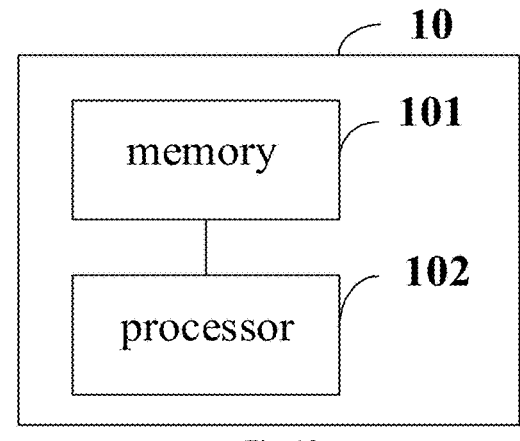
Fig. 10
Fig. 11

MUSIC GENERATION METHOD, MUSIC GENERATION APPARATUS AND COMPUTER-READABLE STORAGE MEDIUM

CROSS-REFERENCE TO RELATED APPLICATION

This application is a continuation of International Patent Application No. PCT/CN2024/089579, filed on Apr. 24, 2024, the content of which is incorporated herein by reference in its entirety.

TECHNICAL FIELD

The present disclosure relates to the field of computer technology, and in particular, a music generation method, music generation apparatus and computer-readable storage medium, computer program product.

BACKGROUND

Music generation technology is an important application in the field of computer technology. With rapid development of artificial intelligence technology, natural language processing technology is widely used in music generation. Using a machine learning model, music data is automatically generated from text data.

However, limited by performance of a machine learning model and accuracy of a user's text description of music, automatically generated music often cannot meet the needs of the user.

SUMMARY

In view of this, an embodiment of the present disclosure provides a music generation method, a music generation apparatus, a computer-readable storage medium and a computer program product. After automatically generating music according to text description, a user can make a targeted adjustment to generated music according to guidance of an agent, and the music is regenerated according to the user's adjustment, so as to improve quality of music generation and enhance the user's experience.

According to a first aspect of some embodiments of the present disclosure, there is provided a music generation method, comprising: receiving a first prompt information input by a user, the first prompt information comprising descriptive information of music; generating a first musical work according to the first prompt information, the first musical work comprising a first music; and generating a second musical work according to an adjustment operation of the user on the first musical work, the adjustment operation comprising at least one of an adjustment operation on the first prompt information or an adjustment operation on the first music.

According to a second aspect of some embodiments of the present disclosure, there is provided a music generation apparatus, comprising: a receiving module configured for receiving a first prompt information input by a user, the first prompt information comprising descriptive information of music; a first generating module configured for generating a first musical work according to the first prompt information, the first musical work comprising a first music; and a second generating module configured for generating a second musical work according to an adjustment operation of the user on the first musical work, the adjustment operation comprising at least one of an adjustment operation on the first prompt information or an adjustment operation on the first music.

According to a third aspect of some embodiments of the present disclosure, there is provided a music generation apparatus, comprising: a memory; and a processor coupled to the memory, the processor being configured to implement any of the preceding music generation methods based on instructions stored in the memory.

According to a fourth aspect of some embodiments of the present disclosure, there is provided a computer-readable storage medium, in which a computer program is stored, and the computer program, when executed by a processor, implements any of the preceding music generation methods.

According to a fifth aspect of some embodiments of the present disclosure, there is provided a computer program product that, when run on a computer, causes the computer to implement any of the preceding music generation methods.

This portion of summary of the invention is provided to introduce a selection of concepts in a simplified form that are further described below in the portion of the preferred embodiments. This portion of summary is not intended to identify key features or essential features of the claimed subject matter, nor is it intended to be used to limit the scope of the claimed subject matter.

By means of the detailed description below of exemplary embodiments of the present disclosure with reference to the drawing attached thereto, further features and advantages of the present disclosure will become clearer.

BRIEF DESCRIPTION OF THE DRAWINGS

Preferred embodiments of the present disclosure will be described below with reference to the accompanying drawings. The accompanying drawings, which are included in and form part of this specification together with the detailed description below, are provided to provide a further understanding of this disclosure, and serve to explain this disclosure. It should be understood that the drawings in the following description only relate to some embodiments of the disclosure, and do not constitute a limitation of the disclosure. In the drawings:

FIG. 1 shows a flowchart of a music generation method according to some embodiments of the present disclosure;

FIG. 2A shows an interactive interface of music generation according to some embodiments of the present disclosure;

FIG. 2B shows an interactive interface of music generation according to some other embodiments of the present disclosure;

FIG. 2C shows an interactive interface of music generation according to some further embodiments of the present disclosure;

FIG. 2D shows an interactive interface of music generation according to some further yet embodiments of the present disclosure;

FIG. 3A shows an editing interface of a first musical work according to some embodiments of the present disclosure;

FIG. 3B shows an editing interface of a musical work according to some other embodiments of the present disclosure;

FIG. 4 shows a flowchart of a first musical work generated according to some embodiments of the present disclosure.

FIG. 5A shows a flowchart of a second musical work generated according to some embodiments of the present disclosure;

FIG. 7 shows a flowchart of a music generation method according to some other embodiments of the present disclosure;

FIG. 8A shows an interactive interface after generating a second musical work according to some embodiments of the present disclosure;

FIG. 8B shows an interactive interface after generating a second musical work according to some other embodiments of the present disclosure;

FIG. 9 shows a block diagram of a music generation apparatus according to some embodiments of the present disclosure;

FIG. 10 shows a block diagram of a music generation apparatus according to some other embodiments of the present disclosure;

FIG. 11 shows a block diagram of an electronic device according to some embodiments of the present disclosure.

Figure 3C:
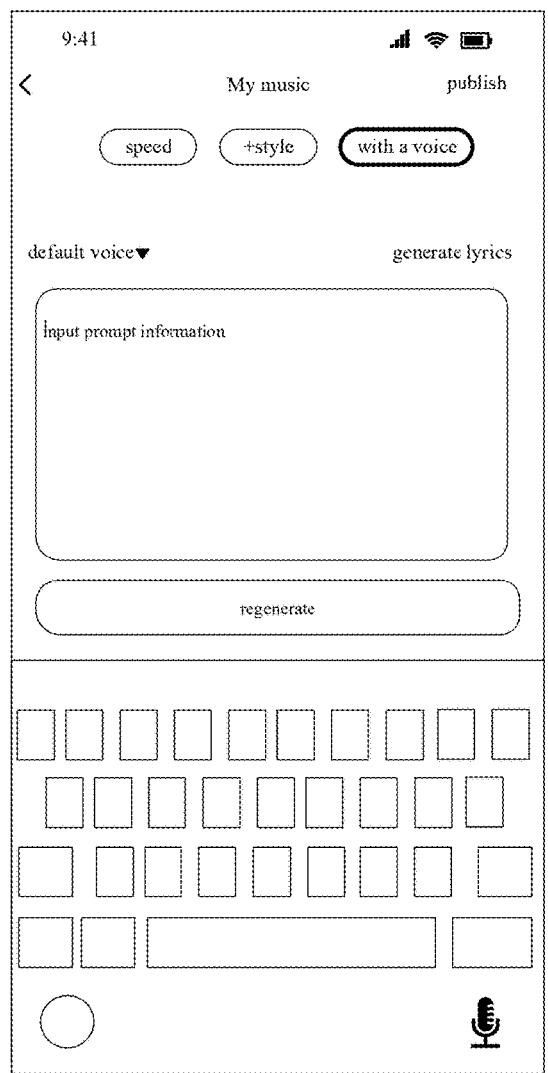
FIG. 3C shows an editing interface of a first musical work according to some further embodiments of the present disclosure.

It should be understood that for the convenience of illustration, dimensions of various parts shown in the drawings are not necessarily drawn according to the actual proportional relationship. The same or similar reference numerals are used in the drawings to indicate the same or similar parts. Therefore, once an item is defined in one drawing, it may not be discussed further in subsequent drawings.

DETAILED DESCRIPTION

With reference to the drawings of the embodiments of the present disclosure, a clear and complete description is given below for the technical solutions of the embodiments of the present disclosure. However, obviously, the embodiments described below are only part of the embodiments, rather than all of the embodiments. The below description of embodiments is actually only illustrative, and should by no means be taken as any restriction over the present disclosure and its application or use. It should be understood that the present disclosure can be embodied in various forms and should not be construed as limited to the embodiments set forth here.

It should be understood that steps described in the method embodiments of the present disclosure may be executed in different sequences and/or in parallel. Further, method embodiments may include additional steps and/or omit execution of illustrated steps. Scope of the present disclosure is not limited in this respect. Unless otherwise specified, arrangement of elements and steps relative to one another, numeric expressions and values recited in these embodiments should be interpreted as merely exemplary and not limiting the scope of the present disclosure.

The term "comprising" and its variants used in this disclosure means an open term including at least the following elements/features, but not excluding other elements/features, that is, "including but not limited to". Further, the term "including" and its variants used in this disclosure means an open term including at least the following elements/features, but not excluding other elements/features, that is, "including but not limited to". Therefore, comprising is synonymous with including. The term "based on" means "at least partially based on".

Reference throughout this specification to "one embodiment", "some embodiments" or "embodiments" means that a particular feature, structure or characteristic described in connection with an embodiment is included in at least one embodiment of the present invention. For example, the term "one embodiment" means "at least one embodiment"; the term "another embodiment" means "at least one other embodiment"; the term "some embodiments" means "at least some embodiments". Moreover, the appearances of the phrases "in one embodiment", "in some embodiments" or "in an embodiment" in various places throughout the specification do not necessarily all refer to the same embodiment, but they may also refer to the same embodiment.

It should be noted that such concepts as "first", "second" etc. mentioned in the present disclosure are only used to distinguish different devices, modules or units, and are not used to limit the order or interdependence of functions performed by these devices, modules or units. Unless otherwise specified, the concepts of "first" and "second" are not intended to imply that the objects so described must be in a given order in time, space, ranking or in any other way.

It should be noted that such modifiers as "a" and "a plurality" mentioned in this disclosure are schematic rather than limiting, and those skilled in the art should understand that unless the context clearly indicates otherwise, they should be understood as "one or more".

Names of messages or information exchanged among multiple devices in the embodiments of the present disclosure are only used for illustrative purposes, and are not used to limit the scope of these messages or information.

Embodiments of the present disclosure will be described in detail with reference to the accompanying drawings, but the present disclosure is not limited to these specific embodiments. The following specific embodiments can be combined with each other, and the same or similar concepts or processes may not be repeated in some embodiments. Further, in one or more embodiments, specific features, structures, or characteristics may be combined in any suitable manner that will be apparent to those of ordinary skill in the art from this disclosure.

In the related music generation technology, limited by performance of a machine learning model and accuracy of a user's text description of music, automatically generated music often cannot meet the needs of the user. In order to improve quality of music generation and enhance a user's experience, an embodiment of the present disclosure provides a new music generation manner. After automatically generating music according to text description, the user can make a targeted adjustment to generated music according to guidance of an agent, and the music is regenerated according to the user's adjustment.

FIG. 1 shows a flowchart of a music generation method according to some embodiments of the present disclosure.

As shown in FIG. 1, the music generation method comprises: step S1, receiving a first prompt information input by a user, the first prompt information comprising descriptive information of music; step S2, generating a first musical work according to the first prompt information, the first musical work comprising a first music; and step S3, generating a second musical work according to an adjustment operation of the user on the first musical work, the adjustment operation comprising at least one of an adjustment operation on the first prompt information or an adjustment operation on the first music.

The music generation method of this embodiment can be executed at the client or partially at the server.

The theme of music comprises, for example, missing hometown, cherish memory of friends, celebrating success or the like. The music picture comprises, for example, sunset, waves, rocks, streets, buildings or the like. The emotional type of music comprises, for example, sad, cheerful, helpless, touching or the like. The style type of music comprises, for example, rock, jazz, pop, folk songs, rap or the like.

The first musical work can comprise a pure musical work without lyrics, comprising only the first music, such as piano music, guitar music and other pure music. The first musical work can also comprise a human vocal musical work, comprising not only the first music, but also human voices corresponding to the first music. Usually a vocal musical work may also comprise lyrics, and content of the lyrics is sung by a human voice.

With reference to FIGS. 2A-2D, a music generation method according to an embodiment of the present disclosure will be further described below. FIGS. 2A-2D show respectively an interactive interface of music generation according to different embodiments of the present disclosure.

As shown in FIG. 2A, in the interactive interface of music generation (also called "music creation"), an input box is provided, for example, "Try to describe the mood or picture" is displayed in the input box to guide the user to input the descriptive information of music. The interactive interface shown in FIG. 2A also displays some musical works that have been generated. For these musical works, the title and cover of the music can be displayed.

FIG. 2B shows another interactive interface of music creation. FIG. 2B also provides an input box, which displays "describe a voice or a picture" to guide the user to input descriptive information of music. In response to activation of the input box, the user can input descriptive information of music in the input box by text or voice through, for example, a keyboard or a voice input device as a prompt information for generating a musical composition. The descriptive information of music can comprise at least one of a theme of music, a visual scene of music, an emotional type of music or a style type of music. If one wants to generate vocal music using his/her own voice, he/she can select a function of "using my voice" shown in FIG. 2B.

Of course, in order to help the user input a more accurate prompt information more efficiently, some suggestions can be provided on the interactive interface for the user to select.

In some embodiments, in step S1, the receiving a first prompt information input by a user comprises: providing at least one candidate prompt template on an interactive interface, each of the at least one candidate prompt template corresponding to a complete music scene, and information of each of the at least one candidate prompt template comprising at least one of a theme of music, a visual scene of music, an emotional type of music or a style type of music; and taking a prompt information in a candidate prompt template selected by the user as part or entire of the first prompt information.

As shown in FIG. 2C, a plurality of candidate prompt templates, such as candidate prompt templates A, B, C, D, E are displayed on the interactive interface for the user to select. For example, information of a candidate prompt template may comprise "Rainy Kyoto" to describe the picture of music. For another example, information of another candidate prompt template may comprise "Embrace the sky happily like a bird" to describe the picture of music as well as the emotional type of music.

Since each candidate prompt template corresponds to a complete music scene, the user can only select one candidate prompt template. A prompt information in a candidate prompt template selected by the user can be directly applied to the input box as a first prompt information. As shown in FIG. 2C, the user selects the candidate prompt template "Embrace the sky happily like a bird", and the corresponding prompt information is directly applied to the input box.

Of course, the user can further adjust the prompt information based on the prompt information of the candidate prompt template, for example, make a modification such as deletion or addition to the prompt information with the keyboard or voice input device shown at the bottom of FIG. 2C. In such an instance, the prompt information in a candidate prompt template selected by the user is used only as part of the first prompt information.

In some other embodiments, the receiving a first prompt information input by a user comprises: providing at least one piece of candidate prompt information on an interactive interface, each of the at least one piece of candidate prompt information comprising at least one of a theme of music, a visual scene of music, an emotional type of music or a style type of music; and taking one or more pieces of candidate prompt information selected by the user, as part or entire of the first prompt information.

As shown in FIG. 2D, a plurality of pieces of candidate prompt information are displayed on the interactive interface for the user to select. For example, the candidate information can comprise prompt information that reflect the theme, picture, emotional type and style type of music, such as missing, rainy day, Kyoto, birds, happy, rock etc.

The user can select multiple pieces of candidate prompt information and combine them. A prompt information selected by the user can be directly applied to the input box as a first prompt information. For example, as shown in FIG. 2D, the user can select a plurality of pieces of candidate prompt information: "birds", "happy". Of course, the user can further adjust the prompt information in the input box. For example, using the keyboard or voice input device shown at the bottom of FIG. 2D, the prompt information "Birds, happy" can be modified to "Birds happily embrace the sky with their wings". For example, in such an instance, the plurality of pieces of prompt information selected by the user are only part of the first prompt information.

With reference to FIGS. 2A-2D, it has been described above how to receive the first prompt information input by the user in step S1. Next, with reference to FIGS. 3A-3D, how to generate a first musical work according to the first prompt information in step S2 will be described.

In step S2, the generating a first musical work according to the first prompt information comprises: generating with a machine learning model, the first music according to the first prompt information.

The machine learning model comprises, for example, a Large Language Model (LLM) or other natural language processing (NLP) model. For example, a machine learning model such as a VAE (Variational Autoencoder), GAN (Generative Adversarial Networks) or a transformer can be used to realize diversified and high-quality music generation.

FIG. 3A shows an editing interface of a first musical work according to some embodiments of the present disclosure. After generating the first music, one can directly access the interactive interface for editing the first music, that is, the editing interface of the first musical work, as shown in FIG. 3A.

As shown in FIG. 3A, the editing interface of the first musical work comprises a control for generating lyrics. In response to the user triggering the control for generating lyrics, first lyrics corresponding to the first music is generated. In some embodiments, the first lyrics is generated with the machine learning model, according to the first prompt information and the first music. As shown in FIG. 3A, the generated lyrics are displayed in the text box at the bottom of the editing interface.

Of course, the first lyrics can also be generated not according to the first prompt information for generating the first music, but according to other prompt information different from the first prompt information. In some embodiments, the method comprises receiving other prompt information input by the user, generating with the machine learning model, the first lyrics according to the other prompt information, the other prompt information comprising descriptive information of the first lyrics. Of course, lyrics can also be generated by comprehensively considering the first music and the prompt information input by the user for generating the lyrics, so that the lyrics generated can better match the music. That is, the first lyrics is generated with the machine learning model, according to the other prompt information and the first music.

In response to the user triggering the control for generating lyrics in FIG. 3A again, one can access the lyrics editing interface, as shown in FIG. 3B. FIG. 3B shows an editing interface of a musical work according to some other embodiments of the present disclosure.

The previously generated lyrics are shown in FIG. 3B. The user can edit the previously generated lyrics through the keyboard or voice input device.

Of course, if the user wants to use lyrics completely different from the previous generated ones, he/she can directly trigger a control for clearing to access an editing interface shown in FIG. 3C. FIG. 3C shows an editing interface of a first musical work according to some further embodiments of the present disclosure.

In FIG. 3C, the user can re-input a prompt information for generating lyrics through the keyboard or voice input device, such as other prompt information different from the first prompt information mentioned above. In response to the user triggering the control for generating lyrics, the first lyrics matched with the first music is generated with the machine learning model, according to the other prompt information.

For vocal music, there needs to be a corresponding voice, that is, comprising a voice of a singer. As shown in FIG. 3A-FIG. 3C, the editing interface of the first music also comprises a control for adding a voice, such as a control with a voice. In response to the user triggering the control with a voice on the editing interface of the first music, a voice corresponding to the first music is generated. For example, a singer's voice is generated according to the first music and the first lyrics. Of course, in case that vocal music does not comprise lyrics, the voices of the singer can also be generated only based on the first music.

For the voices of the singer, the user can use a default voice whose timbre matches the music and lyrics thereof. In some embodiments, the voices of the singer is generated with the machine learning model, according to the first music and the first lyrics. There are many kinds of singers' voices generated by a machine learning model. The user can select a singer's voice as actually needed.

The user can also select his/her own voice as the voices of the singer. In some other embodiments, the voices of the singer can be generated by using voice imitation technology according to the user's voice. Of course, if the voice of the user has been stored in the client or server, it can also be directly invoked based on authorization of the user.

Figure 3D:
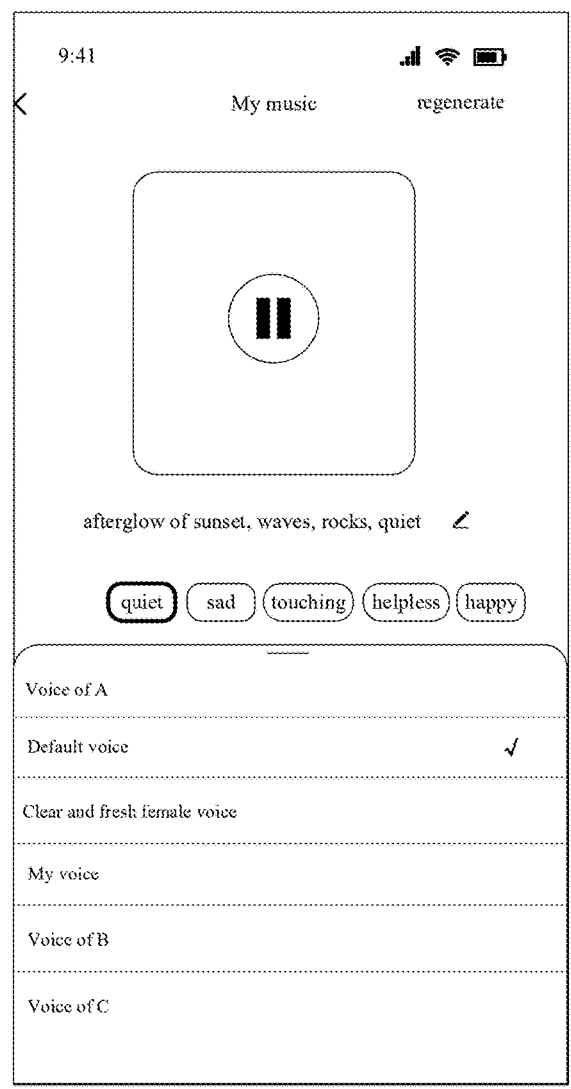
FIG. 3D shows an editing interface of a first musical work according to some further yet embodiments of the present disclosure.

FIG. 3D shows an editing interface of a first musical work according to some further yet embodiments of the present disclosure. As shown in FIG. 3D, in the editing interface of the first musical work, a variety of voices to be selected by the user are displayed. The voice of A shown in FIG. 3D is, for example, the voice of a poet, the voice of B is, for example, the voice of an actor, the voice of C is, for example, the voice of a character in a movie or TV series, and the default voice is, for example, the voice of a singer.

The user can use the default voice, and the default voice can be set based on the user's past selection. Of course, the user can also select another voice as actually needed. For example, the user can select his/her own voice, or he/she can select a voice of another singer according to his/her preference.

With reference to FIG. 4, how to generate the first musical composition with a voice will be described below. FIG. 4 shows a flowchart of a first musical work generated according to some embodiments of the present disclosure.

The first musical work with a voice comprises the first music and a singer's voice, and may or may not comprise the first lyrics. Generation of vocal music comprising the first lyrics is mainly described below.

As shown in FIG. 4, the generating a first musical work according to the first prompt information comprises: step S21, generating with the machine learning model, the first music according to the first prompt information; step S22, receiving a third prompt information input by the user, the third prompt information comprising descriptive information of the first lyrics; S23, generating with the machine learning model, the first lyrics according to the third prompt information; step S24, generating the voices of the singer according to the first music and the first lyrics; and step S25, synthesizing the first musical work according to the first music, the first lyrics, and the voices of the singer.

In step S22, the other prompt information may be the same as the first prompt information, that is, generating the first music and the first lyrics based on the same prompt information. Of course, the other prompt information may be different from the first prompt information. The user can make modification such as addition, deletion on the basis of the first prompt information to obtain another prompt information. The user can also input other prompt information only from the perspective of lyrics instead of making an adjustment on the basis of the first prompt information.

In step S24, in the case of generating the first composition with the first lyrics, an appropriate voice is selected by considering comprehensively the matching of voice, music and lyrics. Of course, if there is no first lyrics, it is possible to only consider the matching of voice and music to select the voice.

In step S25, according to basic attributes of music, a first musical work is synthesized by synchronizing the first music, the first lyrics and the voices of the singer. Of course, the title and cover of the first music can be further synthesized with the first music, the first lyrics and the voices of the singer to generate a more complete first musical work.

How to generate the first music in step S21, how to receive the prompt information input by the user in step S22, how to generate the first lyrics in step S23, and how to generate the voices of the singer in step S24 have been described above, and will not be repeated here.

With reference to FIGS. 2A-3D, how to generate the first music, the first lyrics and the first voice is described above in detail, so as to obtain the first musical work. However, the first music generated at one time is often difficult to meet the user's quality requirements for a musical work, so that it may be necessary for the user to making targeted adjustment to the generation of music. How to generate a second musical work according to the user's adjustment to the first musical work is further described below with reference to FIGS. 5A-5B, and FIG. 6.

FIG. 5A shows a flowchart of a second musical work generated according to some embodiments of the present disclosure. As shown in FIG. 5A, the generating the second musical work according to the adjustment operation of the user on the first musical work comprises: step S31, displaying the first prompt information on the interactive interface; step S32, receiving a modification operation of the user on the first prompt information; step S33, displaying a second prompt information obtained based on the modification operation; and step S34, generating with a machine learning model, the second musical work according to the second prompt information.

The step S31 comprises re-activating the input box of prompt information, displaying in the input box the previously input prompt information, that is, the first prompt information. For example, in response to triggering a pen-shaped editing control shown in FIG. 3A, one can access an interactive interface similar to that shown in FIGS. 2B and 2C.

Apart from displaying the first prompt information used to generate the first music before, a further prompt information can be recommended based on the generated first music, that is, some suggestion can be given to help the user adjust the first musical work.

In some embodiments, at least one recommended prompt information based on the first musical work is displayed on the interactive interface, the recommended prompt information comprising at least one of a theme of music, a visual scene of music, an emotional type of music or a style type of music.

FIG. 3A shows some recommended information, such as pop, jazz, rap, rock, folk and so on, which are related to the style type of music. Regarding the style type of music, FIG. 3A also shows a style control, and in response to the user triggering the control, more style types of music can be provided for the user to select. FIG. 3A further shows some recommended information, such as sad, touching, helpless, happy which are related to the emotional type of music.

For example, after the first music has been generated based on the first prompt information such as "Birds Embrace the Sky with Wings Happily", if the user needs to modify the prompt information, it is possible to recommend some prompt information based on the picture of the first music "Birds Embrace the Sky with Wings", the emotional type of music "happy", such as prompt information about the theme "Celebrate Success" and "Celebrate Graduation", and prompt information about the style type "Pop", "folk", etc. The user can select one or more of recommended prompt information, and the one or more of recommended prompt information selected by the user can be used as part of the second prompt information.

In steps S32 and S33, the user can modify on the basis of the first prompt information to obtain the second prompt information. For example, the first prompt information comprises that the style type of music is pop, and the user can modify it into folk songs to obtain the second prompt information. For another example, the first prompt information comprises that the emotional type of music is sad, and the user can modify it into helpless to obtain the second prompt information. Similarly, the user can modify the theme, picture and so on of music in the first prompt information to obtain the second prompt information.

Of course, the user can also delete part of the descriptive information of music from the first prompt information or add descriptive information of music to the first prompt information to obtain the second prompt information. For example, the first prompt information comprises that the theme of music is to celebrate success, the picture of music is architecture, and the emotion of music is cheerful, the user can delete the descriptive information of the picture of music, and the obtained second prompt information comprises less descriptive information of music, thus reducing restriction on the picture of music to be generated. Of course, in such an instance, the user can also add descriptive information about the style type of music, for example, the style type of music is pop, and the second prompt information obtained comprises more descriptive information of music, so as to improve the matching degree between the generated music and the user's needs.

The step S34 comprises generating a second musical work that better meets the user's needs with the machine learning model according to a second prompt information obtained according to the adjustment to the first prompt information. For example, in response to triggering a control for regeneration as shown in FIG. 3A, a musical work can be regenerated. Similar to the first musical work, the second musical work also comprises a title and cover of the second music.

It should be understood that adjustment operation of the user on the first musical work can be the adjustment operation for the first prompt information, the adjustment operation on the first music, or both. The adjustment operation on the first music may comprise an adjustment to the basic attributes of the music.

In some embodiments, the generating a second musical work according to adjustment operation of the user on the first musical work comprises: generating the second musical work according to adjustment operation of the user on the basic attributes of the first music, which comprise rhythm, melody, timbre and harmony of music.

If the user is not satisfied with the rhythm of the generated first music, the rhythm of the first music can be adjusted separately. The rhythm of music generally comprises beat, speed, stress and style of music. The user can adjust at least one of the beat, speed, stress and style of the first music to realize the adjustment to the rhythm of the first music.

Figure 6:
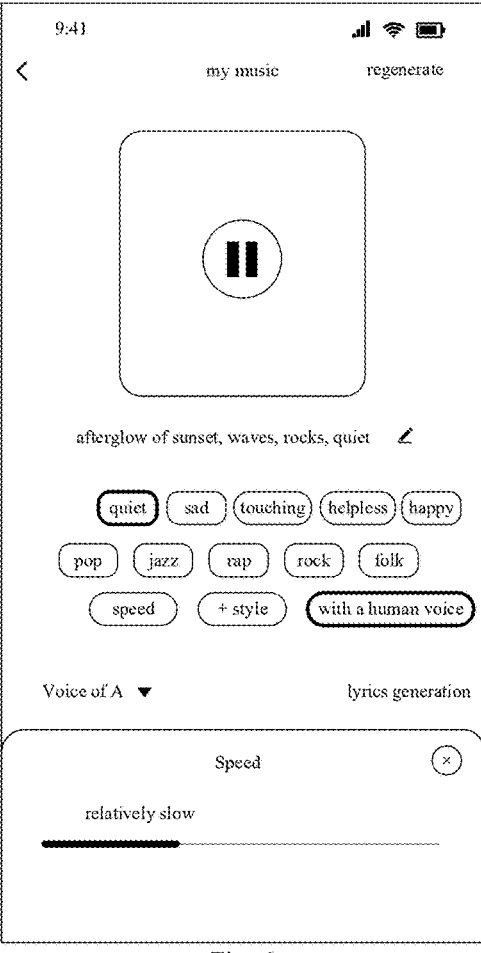
FIG. 6 shows an interactive interface for generating a second musical work according to some embodiments of the present disclosure.

The editing interface shown in FIG. 3A shows a speed control. In response to the user triggering the speed control, one can access an editing interface of speed as shown in FIG. 6. FIG. 6 shows an interactive interface for generating a second musical work according to some embodiments of the present disclosure. As shown in FIG. 6, a user can move the speed adjustment control to adjust the speed of music.

Similarly, the user can also adjust the melody, timbre, harmony, etc. of the first music based on his/her own understanding and preferences of music, so as to get a second musical work that better meets his/her own needs.

The adjustment operation for basic attributes of the first music can be carried out for the whole first music, and the first music can also be adjusted in sections because the music can be divided into sections.

For example, the first music comprises a plurality of sections, and the generating a second musical work according to adjustment operation of the user on the basic attributes of the first music comprises: generating the second musical work according to adjustment operation of the user on the basic attributes of at least one of the plurality of sections of the first music.

It is possible to adjust only the basic attributes of some of the sections in the first music, for example, only adjusting the rhythm of the music section corresponding to the prelude part of the first music and not adjusting other parts of the first music.

The adjustment to the rhythm of the first music can be further refined. For example, each section of music has multiple beats, and it supports the user to adjust the rhythm of the first music in beats, so as to generate more efficiently a musical work that matches the user's needs.

For example, each of a plurality of sections of first music comprises a plurality of beats, and the rhythm of the first music comprises the beats of music. In response to adjustment operation of the user on the basic attributes of the first music, the generating a second musical work comprises: displaying an audio track of the first music, the first music comprising a plurality of audio tracks; and generating the second musical work according to an adjustment operation of the user on at least one of the plurality of audio tracks of the first music.

An audio track can correspond to a part of music. Each audio track can correspond to performance of a musical instrument. The first music may comprise a plurality of audio tracks, displaying the audio tracks of the first music, and it can support the user's adjustment based on the audio tracks, that is, the second musical work can be generated according to adjustment operation of the user on at least one of the plurality of audio tracks of the first music.

For example, among the multiple audio tracks of the first music, a first track corresponds to performance of the drum, which makes the whole music have a rhythmic backbone; a second track corresponds to a rhythm of the bass, which matches the performance of the drum; a third track corresponds to performance of the guitar in rhythm; and a fourth track corresponds to singing of the human voice in harmony with the music. It is possible for the user not to adjust all the tracks, but only some of them. The user can adjust only the performance of the guitar in the third track. In particular, it is possible to adjust not only a duration of each beat in the third track (that is, the note duration), but also the combination law of strong beat and weak beat in the third track, and of course, both of them.

How to generate a second musical work according to the user's adjustment to the first musical work is described above with reference to FIG. 5A and FIG. 6. The above description is made in detail with reference to different embodiments. The user's adjustment to the first musical work comprises both the overall adjustment, such as the adjustment to the first prompt information used to generate the musical work, and the user's adjustment to the first musical work also comprises the local adjustment, such as the adjustment to the basic attributes such as the rhythm and melody of the generated music. Another embodiment of generating a second musical work according to the user's adjustment to the first musical work will be described below with reference to FIG. 5B.

Figure 5B:
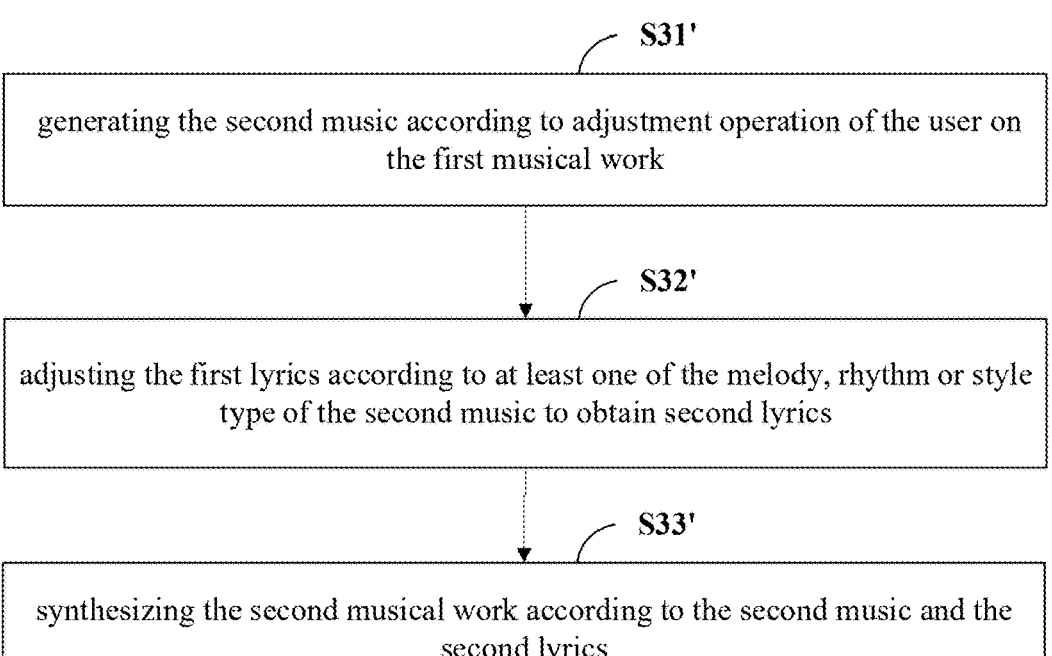
FIG. 5B shows a flowchart of a second musical work generated according to some other embodiments of the present disclosure.

FIG. 5B shows a flowchart of a second musical work generated according to some other embodiments of the present disclosure. As shown in FIG. 5B, the generating a second musical work according to adjustment operation of the user on the first musical work comprises: step S31', generating a second music according to the adjustment operation of the user on the first musical work; S32', adjusting the first lyrics according to at least one of the melody, rhythm or style type of the second music to obtain second lyrics; and step S33', synthesizing the second musical work according to the second music and the second lyrics.

The first musical work comprises the first music and the first lyrics. Since music and lyrics are independent in a musical work, the first music and the first lyrics can be adjusted separately in order to efficiently generate a second musical work that better matches the user's needs.

Firstly, step S31' comprises generating with the machine learning model, second music according to the user's adjustment to the first music. As mentioned above, the adjustment to the first music can be an adjustment to the prompt information used to generate the first music, or an adjustment to the basic attributes of the first music.

Then, in step S32', the first lyrics can be adjusted according to the basic attributes of the second music, such as melody and rhythm, so as to obtain the second lyrics. For example, the rhythm of the second music is faster than that of the first music, and the first lyrics corresponding to the first music may not be suitable for the second music, so that the first lyrics can be adjusted to obtain the second lyrics that match the rhythm of the second music. The second lyrics may also be obtained by adjusting the first lyrics according to the style type of the second music. For example, the style type of the first music is rock, and the style type of the second music is pop. The first lyrics corresponding to the first music is generally not suitable for the second music, so that the first lyrics can be adjusted to obtain the second lyrics that match the style type of the second music.

Of course, in order to adapt to the adjustment to music and lyrics, the voice is adjusted accordingly. That is, generating the voices of the singer according to the second music and the second lyrics.

Finally, in step S33', the second music and the second lyrics are synthesized into the second musical work. Of course, in the case of having a voice, it is also necessary to synthesize the voices of the singer as part of the second musical work. It is also possible to synthesize the title and cover of the second musical work as part of the second musical work.

Various embodiments of the music generation method are described in detail above with reference to FIGS. 1-6. A specific application example of the music generation method will be described below with reference to FIG. 7. FIG. 7 shows a flowchart of a music generation method according to some other embodiments of the present disclosure.

As shown in FIG. 7, the music generation method comprises: step S1', receiving a first prompt information input by a user; step S2', generating first music according to the first prompt information, and generating first lyrics, a first title and a first cover corresponding to the first music to synthesize a first musical work; and step S3', generating a second music according to the adjustment of the user to the first music, and generating second lyrics, a second voice, a second title and a second cover corresponding to the second music to synthesize a second musical work.

Step S1' is similar to step S1 of FIG. 1. At least one prompt information suggestion can be provided on the interactive interface for the user to select as part or entire of the first prompt information.

The prompt information suggestion can be candidate prompt templates, as shown in FIG. 2B, and the user can only select one of them. For example, the user can select the candidate prompt template "rainy Kyoto", and a prompt information comprised in this prompt template is directly applied to an input box of prompt information. The user can directly use such prompt information as a first prompt information for generating the first music. Of course, the user can also adjust the prompt information on this basis, for example, add descriptive information "sad" about the emotional type of music, and obtain the first prompt information with more music descriptive information.

The prompt information suggestion can also be a candidate prompt information, and as shown in FIG. 2C, the user can select multiple pieces of candidate prompt information and combine them. For example, the user can select a plurality of pieces of candidate prompt information: "birds", "happy", and similarly, the prompt information can be directly applied to the input box of prompt information. The user can directly use such prompt information as a first prompt information for generating the first music. Of course, the user can also adjust the prompt information on this basis, for example, add descriptive information "wings", "sky" about the picture of music, and obtain the first prompt information with more music descriptive information.

Next, step S2' comprises generating with the machine learning model the first music according to the first prompt information. It is also possible to generate the first lyrics corresponding to the first music with the machine learning model according to the first prompt information. Of course, in consideration of the independence of music and lyrics, it is also possible to generate the first lyrics according to other prompt information different from the first prompt information. In consideration of the display demand of a musical work, it is also possible to generate a first title and a first cover corresponding to the first music. Then, the first music, first lyrics, first title and first cover are synthesized into the first musical work.

Music generated at one time is often difficult to be directly matched with the user's requirements for the music. Considering the subsequent adjustment, in step S2', it is also possible to generate only the first music, not to generate the first lyrics, first title and first cover, nor to generate the corresponding voice, but to generate the corresponding lyrics, voice, title and cover after the generated music meets the user's needs.

Next, step S3' comprises generating with the machine learning model, second music according to the adjustment of the user to the first music. The adjustment to the first music can be an adjustment to the first prompt information used to generate the first music, or an adjustment to the basic attributes of the first music.

Regarding the adjustment to the prompt information, it is possible to re-activate the input of prompt information, display the previously input prompt information in the input box, to facilitate the user to edit a prompt information on this basis. Besides, it is also possible to display at least one recommended prompt information based on the first music on the interactive interface, to help the user to adjust the first music more appropriately. For example, the first music is generated based on the first prompt information "Birds happily embrace the sky with their wings". On the interactive interface, it is possible to recommend prompt information of the emotional type of music such as "happy" and the theme type of music such as "Celebrating Graduation". In this way, on the basis of the first prompt information and the recommended prompt information, the user can input a second prompt information for generating the second music more efficiently.

Regarding the adjustment to the basic attributes of music, the basic attributes of music can be displayed for the user to adjust the basic attributes of music as a whole. As shown in FIG. 6, a user can move the speed adjustment control to adjust the speed of the first music. Of course, music can also be divided into multiple sections to support the user to adjust the basic attributes of music in sections.

Regarding the adjustment to the basic attributes of music, it is also possible to display audio tracks of music for the user to adjust the basic attributes of music in tracks. The adjustment to each track can be combined with the beat. For example, it is possible to adjust the duration of each beat in a track, and it is also possible to adjust the combination rule of strong beat and weak beat in the track.

After generating the second music that matches the user's needs, it is possible to further generate second lyrics corresponding to the second music.

Similar to generation of the first lyrics, the second lyrics can be generated according to a second prompt information for generating the second music; the second lyrics can also be generated according to other prompt information different from the second prompt information. Of course, it is also possible to adjust the first lyrics according to at least one of the melody, rhythm and style type of the second music on the basis of the first lyrics to obtain second lyrics. This is especially applicable when only the basic attributes of the first music are to be adjusted.

After both the second music and the second lyrics have been matched with the user's needs, for vocal music, there needs to further generate a voice matched with the second music and the second lyrics, that is, a voice of a singer. Similarly, the user can select his/her own voice as the voice of the singer. For example, voice imitation technology is used to generate a voice that matches the second music and the second lyrics. Of course, the machine learning model can also be used to generate one or more human voices that match the second music and the second lyrics for the user to select. For the display demand, it is also possible to generate a second title and a second cover corresponding to the second music.

Finally, the second music, the second lyrics, the second voice, the second title and the second cover are synthesized into a second musical work, as a creation of the user for operations such as publish and share. It is possible to directly trigger a save and publish control on the interactive interface as shown in FIG. 3A. It is also possible to make operations such as publish and share on an interactive interface of the returned musical work.

FIGS. 8A and 8B show an interactive interface after generating a second musical work according to embodiments of the present disclosure; As shown in FIG. 8A, the second musical work, comprising a title and a cover of music, is displayed on the interactive interface. For example, the title of music is displayed as "Afterglow of Sunset and Waves". The cover of music can be displayed as a picture comprising the sunset on the sea. In the input box of the interactive interface shown in FIG. 8A, the prompt information for generating the second musical work "in the afterglow of sunset, the waves beat against the rocks" is also displayed. The user can publish the generated second musical work, for example, by triggering a publish control as shown in FIG. 8A. By triggering the publish control in FIG. 8A by different triggering methods, it is also possible to make such operations as to share, view description thereof or delete the generated musical work, as shown in FIG. 8.

The above is a music generation method provided by embodiments of the present disclosure. With reference to FIGS. 9-11, a music generation apparatus according to an embodiment of the present disclosure will be further described below, for implementing any of the embodiments of the above music generation method.

FIG. 9 shows a block diagram of a music generation apparatus according to some embodiments of the present disclosure.

As shown in FIG. 9, the music generation apparatus 9 comprises: a receiving module 91 configured for receiving a first prompt information input by a user, the first prompt information comprising descriptive information of music; a first generating module 92 configured for generating a first musical work according to the first prompt information, the first musical work comprising a first music; a second generating module 93 configured for generating a second musical work according to an adjustment operation of the user on the first musical work, the adjustment operation comprising at least one of an adjustment operation on the first prompt information or an adjustment operation on the first music.

The receiving module 91 of the music generating apparatus 9 can be configured to perform step S1 of FIG. 1 or step S1' of FIG. 7. The first generating module 92 of the music generating apparatus 9 can be configured to perform step S2 of FIG. 1 or step S2' of FIG. 7. The second generating module 93 of the music generating apparatus 9 can be configured to perform step S3 of FIG. 1 or step S3' of FIG. 7.

FIG. 10 shows a block diagram of a music generation apparatus according to some other embodiments of the present disclosure.

As shown in FIG. 10, a music generation apparatus 10 comprises: a memory 101; and a processor 102 coupled to the memory 101, the processor 102 being configured to execute the music generation method of any of the foregoing embodiments based on instructions stored in the memory 101.

The memory 101 is configured to store one or more computer-readable instructions. The memory 101 may comprise any combination of various forms of computer-readable storage media, such as volatile memory and/or non-volatile memory, comprising but not limited to random access memory (RAM), dynamic random access memory (DRAM), static random access memory (SRAM), read-only memory (ROM) and flash memory. The memory 101 can store, for example, an operating system, application programs, a Boot Loader, a database and other programs, as well as various application programs and various data.

The processor 102 is configured to run a computer-readable instruction to implement the music generation method of any of the aforementioned embodiments. For the specific implementation of each step of the music generation method, one may refer to the above-mentioned embodiment, and repeated portions will not be described here again.

The processor 102 can be configured to perform steps S1-S3 of FIG. 1 or S1'-S3' of FIG. 7. The processor 102 can be embodied as various processing devices, such as a central processing unit (CPU), a network processor (NP), etc. It can also be a digital signal processor (DSP), an application specific integrated circuit (ASIC), a field programmable gate array (FPGA) or other programmable logic devices, discrete gate or transistor logic devices, and discrete hardware components. The central processing unit (CPU) can be X86 or ARM architecture, or the like.

The processor 102 and the memory 101 can communicate with each other directly or indirectly. For example, the processor 102 and the memory 101 may communicate through a network. The network may comprise a wireless network, a wired network, and/or any combination of wireless and wired networks. The processor 102 and the memory 101 can also communicate with each other through a system bus, which is not limited by this disclosure.

It should be noted that the components of the music generation apparatus 10 shown in FIG. 10 are only exemplary, not restrictive, and the music generation apparatus 10 may also have other components according to actual application requirements. The processor 102 can control other components in the music generation apparatus 10 to perform desired functions.

The music generation apparatus can be realized by software, firmware and/or hardware, and can be integrated in electronic equipment with related applications installed.

FIG. 11 shows a block diagram of an electronic device according to some embodiments of the present disclosure.

The electronic device 11 shown in FIG. 11 can be a computer system with a dedicated hardware structure, and can perform corresponding functions when related application programs are installed.

Electronic devices comprise, but are not limited to, mobile terminals such as smart phones, notebook computers, Personal Digital Assistant (PDA), tablet computers (Tablet PC), PMP (Portable Multimedia Player), car terminals (such as car navigation terminals), wearable devices, etc., and fixed terminals such as digital televisions and desktop computers.

As shown in FIG. 11, a central processing unit (CPU) 111 executes various processes according to a program stored in a read-only memory (ROM) 112 or a program loaded into a random access memory (RAM) 113 from a storage section 118. In the RAM 113, data required when the CPU 111 executes various processes and the like is stored as necessary. The central processing unit is only exemplary, and it can also be other types of processors, such as the various processors mentioned above. The ROM 112, the RAM 113 and the storage section 118 may be various forms of computer-readable storage media. It should be noted that although the ROM 112, the RAM 113 and the storage section 118 are shown in FIG. 11, one or more of them may be merged or located in the same or different memories or storage modules.

The CPU 111, the ROM 112 and the RAM 113 are connected to each other via a bus 114. An input/output interface 115 is also connected to the bus 114.

The following components are connected to the input/output interface 115: an input section 116 such as a touch screen, a touch pad, a keyboard, a mouse, an image sensor, a microphone, an accelerometer, a gyroscope, etc.; an output section 117 comprising a display such as a cathode ray tube (CRT), a liquid crystal display (LCD), a speaker, a vibrator, and the like; a storage section 118 comprising a hard disk, a magnetic tape, etc., and a communication section 119 comprising a network interface card such as a LAN card, a modem, and the like. The communication section 119 allows communication processing to be performed via a network such as the Internet. It is easy to understand that although various devices or modules in the electronic device 11 are shown in FIG. 11 to communicate through the bus 114, they may also communicate through a network or other means, wherein the network may comprise a wireless network, a wired network, and/or any combination of the wireless network and the wired network.

The driver 1110 is also connected to the input/output interface 115 as needed. A removable medium 1111, such as a magnetic disk, an optical disk, a magneto-optical disk, a semiconductor memory, etc., is installed on the drive 1110 as needed, so that a computer program read from it is installed in the storage section 118 as needed.

When the above-mentioned series of processes are realized by software, the program constituting the software can be installed from a network such as the Internet or a storage medium such as the removable medium 1111.

According to an embodiment of the present disclosure, the process described above with reference to the flowchart can be implemented as a computer software program. For example, some embodiments of the present disclosure comprise a computer program product that, when run on a computer, causes the computer to implement the music generation method described in any of the previous embodiments. The computer program product comprises a computer program carried on a computer-readable medium, the computer program comprising a program code for executing the method shown in the flowchart. In such an embodiment, the computer program can be downloaded and installed from the network through the communication device 119, or installed from the storage section 118, or installed from the ROM 112. When the computer program is executed by the CPU 111, the music generation method of the embodiment of the present disclosure is executed.

It should be noted that, in the context of the present disclosure, a computer-readable medium may be a tangible medium that may contain or store a program for use by or in connection with an instruction execution system, device or apparatus.

The computer-readable medium can be a computer-readable storage medium or a computer-readable signal medium or any combination thereof.

The computer-readable storage medium comprises but not limited to, an electrical, magnetic, optical, electromagnetic, infrared, or semiconductor system, device or unit, or any combination of the above. More examples of computer-readable storage media may comprise, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, a computer-readable storage medium can be any tangible medium containing or storing a program, which program can be used by or in combination with an instruction execution system, device or unit. A computer storage medium, on which a computer program is stored, and the computer program, when executed by a processor, implements the music generation method according to any of the foregoing embodiments.

The computer-readable signal medium may comprise a data signal propagated in baseband or as part of a carrier wave, in which computer-readable program code is carried. This propagated data signal can take many forms, comprising but not limited to an electromagnetic signal, an optical signal or any suitable combination of the above. A computer-readable signal medium can also be any computer-readable medium other than a computer-readable storage medium, which can send, propagate or transmit a program for use by or in connection with an instruction execution system, device or unit. Program code contained in the computer-readable medium can be transmitted by any suitable medium, comprising but not limited to: a wire, an optical cable, a RF (radio frequency) and the like, or any suitable combination of the above.

The above-mentioned computer-readable medium may be comprised in the electronic device; or it can exist independently without being assembled into the electronic device.

In some embodiments, there is further provided a computer program, comprising instructions which, when executed by a processor, cause the processor to execute the music generation method according to any of the above embodiments. For example, the instructions may be embodied as computer program code.

In the embodiment of the present disclosure, computer program code for performing operations of the present disclosure may be written in one or more programming languages or their combinations, comprising but not limited to object-oriented programming languages, such as Java, Smalltalk, C++, and conventional procedural programming languages, such as "C" language or similar programming languages. The program code can be completely executed on the user's computer, partially executed on the user's computer, executed as an independent software package, partially executed on the user's computer and partially executed on a remote computer, or completely executed on a remote computer or server. In the case involving a remote computer, the remote computer may be connected to a user computer through any kind of network, comprising a local area network (LAN) or a wide area network (WAN), or may be connected to an external computer (for example, through the Internet using an Internet service provider).

The flowcharts and block diagrams in the drawings illustrate the architecture, functions and operations of possible implementations of systems, methods and computer program products according to various embodiments of the present disclosure. In this regard, each block in the flowchart or block diagram may represent a module, a program segment, or part of codes that contains one or more executable instructions for implementing a specified logical function. It should also be noted that in some alternative implementations, the function noted in the block may occur in a different order than that noted in the drawing. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

Functions described above may be at least partially performed by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD) and so on.

Although some specific embodiments of the present disclosure have been described in detail through examples, it should be understood by those skilled in the art that the above examples are only for illustration and are not intended to limit the scope of the present disclosure. It should be understood by those skilled in the art that the above embodiments can be modified without departing from the scope and spirit of the present disclosure. The scope of the present disclosure is defined by the appended claims.

What is claimed is:

1. A music generation method, comprising:

receiving a first prompt information input by a user, the first prompt information comprising descriptive information of music;

generating with a machine learning model, a first musical work according to the first prompt information, the first musical work comprising a first music; and generating with the machine learning model, a second musical work according to an adjustment operation of the user on the first musical work, the adjustment operation comprising an adjustment operation on the first prompt information, wherein the generating the second musical work according to the adjustment operation of the user on the first musical work, comprises:

displaying the first prompt information on an interactive interface;

receiving a modification operation of the user on the first prompt information;

displaying a second prompt information obtained based on the modification operation; and generating the second musical work according to the second prompt information.

2. The music generation method according to claim 1, wherein the generating the second musical work according to the adjustment operation of the user on the first musical work, comprises:

displaying on the interactive interface, at least one piece of recommended prompt information based on the first musical work, the recommended prompt information comprising at least one of a theme of music, a visual scene of music, an emotional type of music or a style type of music; and taking one or more of recommended prompt information selected by the user, as part of the second prompt information.

3. The music generation method according to claim 1, wherein the adjustment operation further comprises an adjustment operation on the first music, and the generating the second musical work according to the adjustment operation of the user on the first musical work, comprises:

generating the second musical work according to an adjustment operation of the user on basic attributes of the first music, the basic attributes comprising rhythm, melody, timbre and harmony of music.

4. The music generation method according to claim 3, wherein the first music comprises a plurality of sections, and the generating the second musical work according to the adjustment operation of the user on the basic attributes of the first music, comprises:

generating the second musical work according to an adjustment operation of the user on the basic attributes of at least one of the plurality of sections of the first music.

5. The music generation method according to claim 4, wherein the rhythm of the first music comprises beats of the first music, and the generating the second musical work according to the adjustment operation of the user on the basic attributes of the first music, comprises:

displaying an audio track of the first music; and generating the second musical work according to an adjustment operation of the user on the first music based on the audio track, the adjustment operation on the first music comprises at least one of adjusting a duration of each of the beats of the first music or adjusting a combination rule among the beats of the first music.

6. The music generation method according to claim 3, wherein the generating the second musical work according to the adjustment operation of the user on the basic attributes of the first music, comprises:

displaying an audio track of the first music, the first music comprising a plurality of audio tracks; and generating the second musical work according to an adjustment operation of the user on at least one of the plurality of audio tracks of the first music.

7. The music generation method according to claim 1, wherein the first musical work further comprises first lyrics, and the generating the first musical work according to the first prompt information, comprises:

generating with the machine learning model, the first music according to the first prompt information;

generating with the machine learning model, the first lyrics according to the first prompt information and the first music; and synthesizing the first musical work from the first music and the first lyrics.

8. The music generation method according to claim 7, wherein the generating the second musical work according to the adjustment operation of the user on the first musical work, comprises:

generating a second music according to the adjustment operation of the user on the first musical work;

adjusting the first lyrics according to at least one of melody, rhythm or style type of the second music to obtain second lyrics; and synthesizing the second musical work from the second music and the second lyrics.

9. The music generation method according to claim 7, wherein the generating the second musical work according to the adjustment operation of the user on the first musical work, comprises:

generating a second music according to the adjustment operation of the user on the first musical work, the second music comprises a plurality of sections, each section of the plurality of sections comprises a plurality of beats;

adjusting the first lyrics according to at least one of the each section, a duration of each beat of the plurality of beats, or stress of the second music to obtain second lyrics; and synthesizing the second musical work from the second music and the second lyrics.

10. The music generation method according to claim 1, wherein the first musical work is vocal music comprising first lyrics and voices of a singer, and the generating the first musical work according to the first prompt information, comprises:

generating with the machine learning model, the first music according to the first prompt information;

receiving a third prompt information input by the user;

generating with the machine learning model, the first lyrics according to the third prompt information;

generating the voices of the singer according to the first music and the first lyrics; and synthesizing the first musical work from the first music, the first lyrics, and the voices of the singer.

11. The music generation method according to claim 10, wherein the generating with the machine learning model, the first lyrics according to the third prompt information, comprises:

generating with the machine learning model, the first lyrics according to the third prompt information and the first music.

12. The music generation method according to claim 10, wherein the generating the voices of the singer according to the first music and the first lyrics, comprises:

generating the voices of the singer by using voice imitation technology according to voices of the user, the first music and the first lyrics; or generating with the machine learning model, the voices of the singer according to the first music and the first lyrics.

13. The music generation method according to claim 1, wherein the receiving the first prompt information input by the user comprises:

providing at least one candidate prompt template on an interactive interface, each of the at least one candidate prompt template corresponding to a complete music scene, and information of each of the at least one candidate prompt template comprising at least one of a theme of music, a visual scene of music, an emotional type of music or a style type of music, wherein a prompt information in a candidate prompt template selected by the user is part or entire of the first prompt information.

14. The music generation method according to claim 1, wherein the receiving the first prompt information input by the user comprises:

providing at least one piece of candidate prompt information on an interactive interface, each of the at least one piece of candidate prompt information comprising at least one of a theme of music, a visual scene of music, an emotional type of music or a style type of music; and taking one or more pieces of candidate prompt information selected by the user, as part or entire of the first prompt information.

15. The music generation method according to claim 1, wherein:

the first musical work comprises a title and a cover of the first musical work;

the second musical work comprises a title and a cover of the second musical work; and the descriptive information of music comprises at least one of a theme of music, a visual scene of music, an emotional type of music or a style type of music.

16. A music generation apparatus, comprising:

a memory; and a processor coupled to the memory, the processor being configured to, based on instructions stored in the memory, implement a music generation method, comprising:

receiving a first prompt information input by a user, the first prompt information comprising descriptive information of music;

generating a first musical work according to the first prompt information, the first musical work comprising a first music; and generating a second musical work according to an adjustment operation of the user on the first musical work, the adjustment operation comprising an adjustment operation on the first prompt information, wherein the generating the second musical work according to the adjustment operation of the user on the first musical work, comprises:

displaying the first prompt information on an interactive interface;

receiving a modification operation of the user on the first prompt information;

displaying a second prompt information obtained based on the modification operation; and generating with a machine learning model, the second musical work according to the second prompt information.

17. The music generation apparatus according to claim 16, wherein the generating the second musical work according to the adjustment operation of the user on the first musical work, comprises:

displaying the first prompt information on an interactive interface;

receiving a modification operation of the user on the first prompt information;

displaying a second prompt information obtained based on the modification operation; and generating with a machine learning model, the second musical work according to the second prompt information.

18. The music generation apparatus according to claim 17, wherein the generating the second musical work according to the adjustment operation of the user on the first musical work, comprises:

displaying on the interactive interface, at least one piece of recommended prompt information based on the first musical work, the recommended prompt information comprising at least one of a theme of music, a visual scene of music, an emotional type of music or a style type of music; and taking one or more of recommended prompt information selected by the user, as part of the second prompt information.

19. A non-transitory computer-readable storage medium, on which instructions are stored, and the instructions, when executed by a processor, implement a music generation method, comprising:

receiving a first prompt information input by a user, the first prompt information comprising descriptive information of music;

generating a first musical work according to the first prompt information, the first musical work comprising a first music; and generating a second musical work according to an adjustment operation of the user on the first musical work, the adjustment operation comprising an adjustment operation on the first prompt information, wherein the generating the second musical work according to the adjustment operation of the user on the first musical work, comprises:

displaying the first prompt information on an interactive interface;

receiving a modification operation of the user on the first prompt information;

displaying a second prompt information obtained based on the modification operation; and generating with a machine learning model, the second musical work according to the second prompt information.

* * * * *